A. C. CARNES.
Harrows.

No. 140,403. Patented July 1, 1873.

Witnesses:
A. Bennerkendorf.
Francis W. Shedle.

Inventor:
A. C. Carnes
per Munn & Co
Attorneys.

UNITED STATES PATENT OFFICE.

ALEXANDER C. CARNES, OF SMITHVILLE, TENNESSEE.

IMPROVEMENT IN HARROWS.

Specification forming part of Letters Patent No. 140,403, dated July 1, 1873; application filed November 11, 1871.

*To all whom it may concern:*

Be it known that I, ALEXANDER C. CARNES, of Smithville, in the county of De Kalb and State of Tennessee, have invented a new and useful Improvement in Harrow; and I do hereby declare that the following is a full, clear, and exact description thereof, which will enable others skilled in the art to make and use the same, reference being had to the accompanying drawing forming part of this specification.

Figure 1:
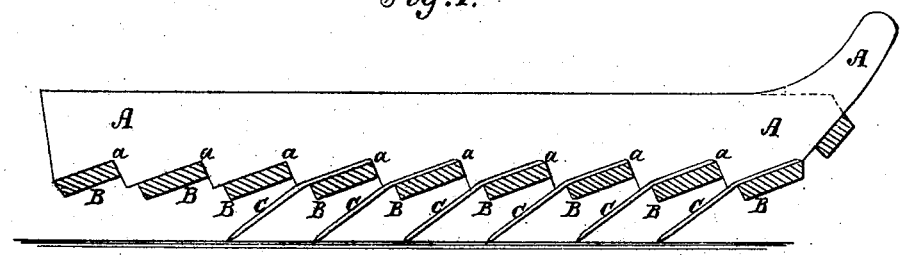
Figure 2:
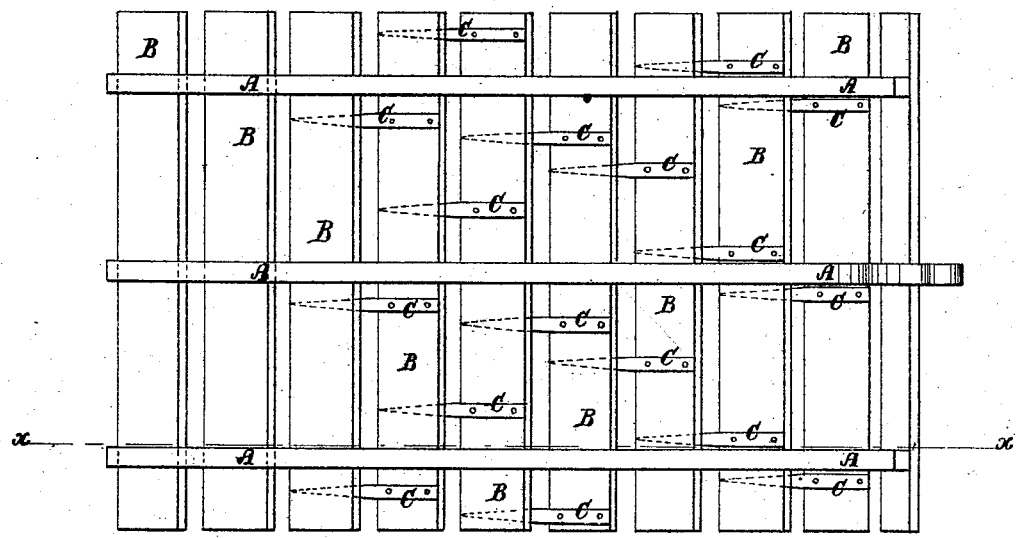

Figure 1 is a vertical longitudinal section of my improved harrow taken through the line $x\ x$, Fig. 2. Fig. 2 is a top view of the same.

Similar letters of reference indicate corresponding parts.

The invention consists in constructing a harrow-frame of longitudinal and cross pieces, the first on edge while the second are flat, and the first notched underneath so as to receive and brace the second. This forms a very strong, durable, and cheap harrow-frame, which any farmer can construct for himself. I will first describe my invention in connection with all that is necessary to a full understanding thereof, and then clearly point it out in the claim.

A are the longitudinal timbers, which should be made of suitable length and size. In the lower sides of the timbers A are formed notches $a'$, which are made deeper at their forward ends than at their rear ends. The timbers A are placed parallel with each other and at suitable distances apart—say, eighteen or twenty inches—and to them in the notches $a'$ are secured cross-strips B, the inclination of the notches $a'$ giving an inclination to the cross-strips B, and making their forward edges the higher. The lower side of the forward ends of the longitudinal timbers A are beveled off or made inclined, and the forward end of the middle timber should project for the attachment of the draft. C are the teeth, the upper ends or shanks of which are passed up through the slots or spaces between the edges of the cross-pieces B, and are securely bolted to said pieces. The lower or working parts of the teeth C project to the rearward and are inclined downward, the precise angle at which they are set being immaterial. The forward teeth C may be made with sharp forward edges, and the rear teeth may be made like ordinary harrow-teeth; or all the teeth may be made alike, as may be desired. The teeth C should be so arranged upon the strips B that no two of them may travel in the same path; and I prefer to leave the rear strips B without teeth, as leaving the ground smoother and more level. The harrow may be made larger or smaller, according to the work for which it is designed; or two of them may be connected together for cultivating both sides of a row of plants at the same time. For some purposes the teeth C may be detached or omitted, especially if there are no sods to be torn in pieces.

Having thus described my invention, I claim as new and desire to secure by Letters Patent—

The longitudinal timbers A having notch $a'$, the inclined cross-timbers B, and the teeth C, combined substantially as and for the purpose described.

ALEXANDER C. CARNES.

Witnesses:
ROBERT C. NESMITH,
MONTRAVILLE D. SMALLMAN.